United States Patent [19]

Bush

[11] 4,419,314
[45] Dec. 6, 1983

[54] METHOD OF COATING CORE SAMPLES

[75] Inventor: Darrell Bush, Colleyville, Tex.

[73] Assignee: Core Laboratories, Inc., Dallas, Tex.

[21] Appl. No.: 266,990

[22] Filed: May 26, 1981

[51] Int. Cl.³ .............................................. B29C 1/02
[52] U.S. Cl. .................................... 264/130; 264/139; 264/264; 264/271.1; 264/279
[58] Field of Search ............... 264/130, 139, 135, 264, 264/271.1, 279

[56] References Cited

U.S. PATENT DOCUMENTS

| | | | |
|---|---|---|---|
| 2,737,804 | 3/1956 | Herzog | 73/38 |
| 2,842,958 | 7/1958 | Sayer et al. | 73/38 |
| 3,059,283 | 10/1962 | Budovec | 264/271.1 |
| 3,199,341 | 8/1965 | Heuer, Jr. et al. | 73/94 |
| 3,242,446 | 3/1966 | Leute | 264/264 |

Primary Examiner—John A. Parrish
Attorney, Agent, or Firm—Lee C. Robinson, Jr.

[57] ABSTRACT

A method of coating a core sample in which a distillate such as petroleum jelly is applied to the exterior surface of the sample. A cylindrical mold is partially filled with a plastic mixture of hardenable epoxy resin and hardener therefor, and one end of the core sample is slowly inserted into the mold under a pressure which preferably is not more than about 50 pounds per square inch. In some cases the inserted end of the sample is pre-coated with the plastic mixture. As the insertion of the sample is continued, the mixture flows up the side of the sample and covers the opposite end. The coating is cured by maintaining it in the mold at room temperature for a period of time sufficient to enable the resin to set up and then by holding it at an elevated temperature for at least about eight hours. Upon the removal of the coated sample from the mold, the ends are cut off to expose the sample material.

7 Claims, 7 Drawing Figures

METHOD OF COATING CORE SAMPLES

BACKGROUND OF THE INVENTION

This invention relates to a method of coating core samples and more particularly to a method of applying an epoxy resin coating to core samples removed from well boreholes.

In the drilling of oil and gas wells, for example, it is customary, when the drilling bit approaches an underground formation that may contain oil or gas, to take core samples of the strata traversed during the ensuing drilling. These samples are brought to the surface and analyzed for such characteristics as lithology, porosity, permeability, compressibility, oil and water saturation, etc., and the resulting data is used to determine whether the underground formation is capable of producing oil or gas on a commercially acceptable basis and for reservoir evaluation.

The various characteristics of the core sample are measured with the sample mounted in a core holder, illustratively of the triaxial type, which has various pressure and other connections for making the desired measurements. The sample is positioned within the holder in a deformable rubber or plastic sleeve, and a confining pressure is applied to the sleeve which may approximate the underground effective overburden pressure to which the sample had been subjected prior to its removal from the borehole. While it is desirable to have such core analyses performed reasonably promptly after the removal of the samples from the borehole so that the data obtained may be utilized in determining whether further drilling is needed or whether the well may be completed for production at the horizon already reached, it is customary to retain the sample so that it will be available for subsequent inspection and analysis perhaps even years after the drilling of the well. Accordingly, extensive storage facilities often are provided for maintaining and preserving the samples recovered from wells so they may be examined and subjected to further testing by geologists or other testing personnel.

Heretofore, difficulties have been encountered in the realization of accurate and reliable measurements of the various characteristics of core samples of this general type. As an illustration, the comparatively high confining pressure applied to the core holder sleeve on occasion urged the sleeve into the exposed pores of the sample, with a resulting adverse affect on porosity and other measurements. As another illustration, and this has been a special moment in cases in which the sample was stored for a period of time, grains at the surface of the sample became loose during repeated handling and further interfered with the desired measurements. In addition, the samples often would not fit with the necessary precision in the thick-wall steel molds used for uniaxially confined sample tests.

SUMMARY

One general object of this invention, therefore, is to provide a method for coating core samples removed from well boreholes.

More specifically, it is an object of this invention to provide a method for applying an impervious coating to a core sample which is stiff enough to prevent intrusion of the coating material into the pores of the sample under high confining pressure and yet is sufficiently flexible to transmit the pressure applied through the core holder sleeve during the making of a measurement.

Another object of the invention is to provide such a method in which the coating effectively prevents the deleterious loosening of grains from the surface of the sample.

A further object of the invention is to provide a method for coating a core sample in a straightforward and inexpensive manner.

In accordance with an illustrative embodiment of the invention, the core sample is thoroughly cleaned, and petroleum jelly is applied as a barrier or release material to its exterior surface. The sample is then coated in a mold with a plastic mixture of hardenable epoxy resin and hardener. The dimensions of the mold are carefully controlled in relation to the dimensions of the core sample to provide an extremely thin but rigid coating on the sample. The coating is cured in a unique manner, and the ends of the coated sample are cut away to expose the sample material.

In accordance with one feature of several important embodiments of the invention, the mold is first partially filled with the plastic mixture, and the core sample is then slowly inserted into the mold under a pressure which is not more than about 50 pounds per square inch. As the sample is inserted, the mixture flows up the side of the sample until it covers the upper, exposed end. The resulting coating is thin with very few voids or other imperfections.

In accordance with another feature of the invention, in a number of preferred arrangements, prior to the insertion of the core sample into the mold one end of the sample is coated with a plastic mixture of hardenable epoxy resin and hardener, and the coating is cured sufficiently to effectively seal the coated end. As the sample is pressed into the mold, the coated end serves as a barrier to prevent the plastic mixture within the mold from entering the interior of the sample to any appreciable extent.

In accordance with a further feature of certain particularly advantageous embodiments of the invention, the space between the exterior surface of the core sample and the interior of the mold is at least about 0.010 cm. and not more than about 0.050 cm., with the result that the thickness of the coating is maintained within this range. The coating thickness is sufficient to prevent the coating from intruding into the sample pores during the application of the confining pressure while at the same time the coating is thin enough to provide the necessary flexibility to transmit the confining pressure to the sample.

In accordance with still another feature of the invention, in some arrangements, the coating on the core sample is cured by maintaining it at room temperature for at least about four hours and thereafter maintaining it at an elevated temperature for at least about eight hours. The curing procedure further enhances the overall integrity of the coating.

The present invention, as well as further objects and features thereof, will be understood more clearly and fully from the following description of a preferred embodiment, when read with reference to the accompanying drawings.

DESCRIPTION OF A PREFERRED EMBODIMENT

Figure 1:
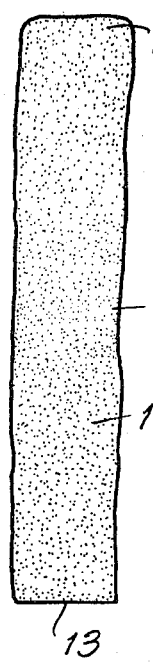
FIG. 1 is a vertical sectional view of a cylindrical core sample which is to be coated through the use of a method in accordance with an illustrative embodiment of the invention.

Referring to FIG. 1 of the drawings, there is shown a core sample 10 taken from a well borehole. The sample 10 comprises a generally cylindrical section of the underground solid formation and has a more or less porous structure with occasional pore spaces or voids in its cylindrical surface 11 and its end surfaces 12 and 13. The sample is to be tested for such characteristics as porosity, permeability, compressibility, water content, hydrocarbon saturation, etc. In addition, direct information relating to fluid flow characteristics, physical, chemical, electrical and acoustic properties, and the like, also is of value and can be obtained only from an actual sample of the formation.

It is of particular importance to restore the core sample 10 to the state in which it existed in the strata below the surface of the earth. Otherwise, some of the determinations referred to above, which depend upon the physical structure of the sample, will be inaccurate. Accordingly, as these determinations are made it is customary to subject the sample to a high confining pressure, illustratively 10,000 pounds per square inch, which approximates the effective overburden pressure to which the sample material was subjected in the underground strata. The confining pressure is applied during the running of the various tests while the sample is mounted in a suitable core holder.

Figure 7:
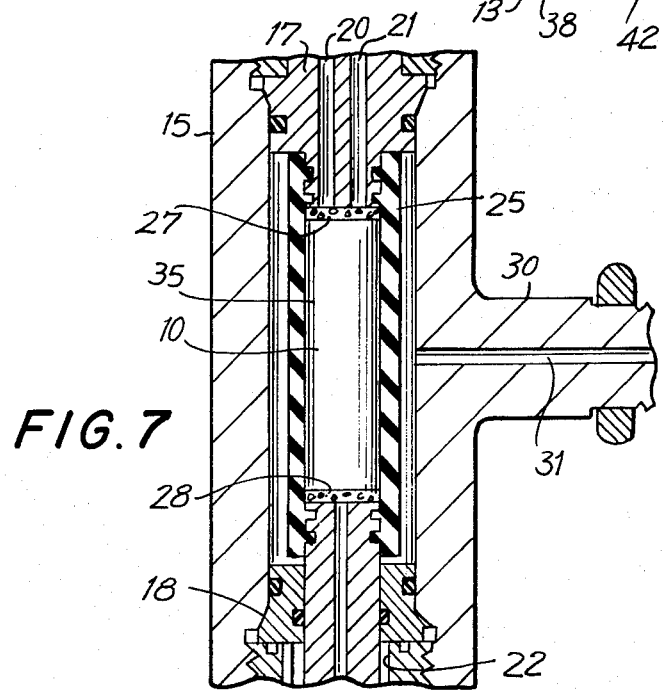
FIG. 7 is a fragmentary vertical sectional view of a core holder for the sample.

One such core holder is illustrated in FIG. 7. The core holder comprises a hollow body portion 15 of generally cylindrical configuration which is provided with end caps 17 and 18 having appropriate channels 20, 21 and 22 for the application of pressures and fluids in accordance with the particular tests being conducted. The core sample 10 is inserted within a flexible rubber or plastic sleeve 25, and the assembled sleeve and sample are mounted within the body portion 15 between two permeable steel discs 27 and 28 which are located adjacent the respective ends of the sample.

Extending radially from the axial midpoint of the body portion 15 is a pressure connection 30. The connection 30 is integrally formed with the body portion 15 and is provided with a channel 31 which communicates with the interior of the body portion. During the making of a particular measurement, the confining pressure is applied through the channel 31 to the flexible sleeve 25 and hence to the core sample 10.

The high confining pressure applied to the flexible sleeve 25 tends to force the sleeve into the open pore spaces in the core sample 10 being tested. This intrusion of the sleeve into the pore spaces can have a significant adverse affect on the accuracy of the test results. In accordance with the present invention, however, the core sample is encased in a plastic coating 35 which is sufficiently rigid to prevent the intrusion of either the plastic or the sleeve into the pore spaces and yet is sufficiently flexible to enable the application of the desired confining pressure to the sample.

To apply the coating 35 in the core sample 10, the core sample is first cleaned of salt and oil by flushing the sample with methanol and other organic cleaning material. The sample is then placed in an oven and is dried at an elevated temperature, illustratively 180° F.

Figure 2:
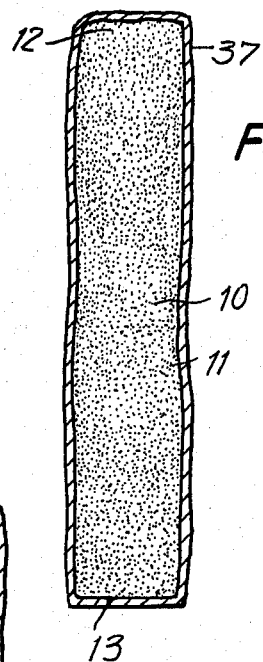
FIG. 2 is a vertical sectional view of the core sample of FIG. 1 after a barrier material has been applied thereto.

As best seen in FIG. 2, a barrier material 37 is applied to the entire exposed surface of the cleaned and dried core sample 10. Although a wide variety of barrier materials may be used for this purpose, petroleum jelly or other petroleum distillate is preferred because of its good release properties. The material 37 is worked into the cylindrical surface 11 and the end surfaces 12 and 13 of the sample 10, and any excess material is removed by a jet of air or by hand rubbing.

The material for the coating 35 comprises a conventional plastic mixture of hardenable epoxy resin and a suitable hardener therefor. Among the various epoxies that may be employed for this purpose is the coating compound available commercially from the Dexter Corporation, Olean, N.Y., and identified by the trade name HYSOL coating compound C9-4183. The hardener used with the compound is Dexter's hardener H9-3469.

Figure 3:
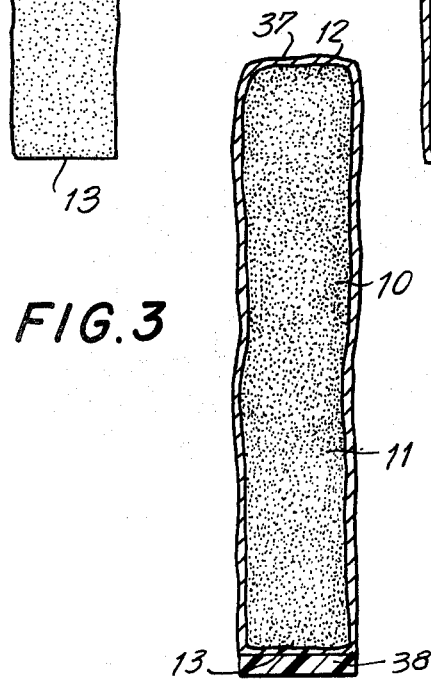
FIG. 3 is a vertical sectional view of the core sample of FIG. 2 with a plastic coating on one end thereof.

In some embodiments of the invention, particularly in cases in which one of the two end surfaces 12 and 13 of the core sample 10 contains a large number of surface voids, a layer 38 (FIG. 3) of the plastic mixture is applied over the entire area of the surface. The thus formed end coating is permitted to cure at room temperature for at least about four hours to provide a fluid impervious seal.

The plastic coating 35 is applied to the core sample 10 in a cylindrical mold 40. The mold 40 comprises a stainless steel cylinder having a polished interior wall 41 and a base member 42 which closes the lower end of the mold. The inside diameter of the mold 40 should be maintained within well-defined limits in relation to the core sample 10 to similarly maintain the thickness of the coating 35 within these limits. Thus, for best results the inside diameter of the mold should be at least about 0.020 cm. and not more than about 0.100 cm. greater than the diameter of the core sample in order to provide a coating thickness within the range of about 0.010 cm. to about 0.050 cm. If the thickness of the coating is less than about 0.010 cm., the coating can exhibit insufficient strength to resist intrusion into the pores of the sample under the high confining pressure applied through the channel 31 (FIG. 7) of the core holder, while if the thickness exceeds about 0.050 cm. the coating becomes too rigid and may not adequately transmit the confining pressure to the sample.

The mold 40 is coated with a suitable mold release material and is then partially filled with the plastic mixture of hardenable epoxy resin and hardener immediately after the mixture is prepared. The mixture by weight is illustratively 93% C9-4183 HYSOL epoxy resin and 7.0% H9-3469 aromatic/alaphatic amine hardener. The lower end 13 of the core sample 10 is slowly inserted in the partially filled mold to cause the plastic mixture to flow up around the cylindrical surface 11 of the sample and over the upper end 12. As the sample 10 enters the mold 40, pressure is applied to the end 12 to urge the sample into the plastic mixture at a carefully controlled rate. This pressure advantageously is not more than about 50 pounds per square inch, because for higher pressures the sample enters the mixture too rapidly and causes the entrapment of air which creates open spaces or thin wall sections in the coating, and the plastic may be forced into pores adjacent the lower surface 13. The minimum pressure applied during the insertion of the sample for the most part depends on the setting time of the mixture, but the pressure generally should not be less than about 5 pounds per square inch. If the applied pressure is much below this figure, the sample enters the mixture too slowly with the result that the mixture tends to begin hardening before the sample reaches its fully inserted position. Particularly good results are achieved by maintaining the pressure at about 9 or 10 pounds per square inch.

In embodiments in which the end 13 of the core sample 10 is pre-coated with the plastic layer 38, the applied pressure may be greater than would otherwise be the case. The layer 38 serves as a barrier which prevents the flow of plastic into the pore spaces in the vicinity of the end 13, and the sample may be inserted into the mold 40 at a more rapid rate.

Figure 5:
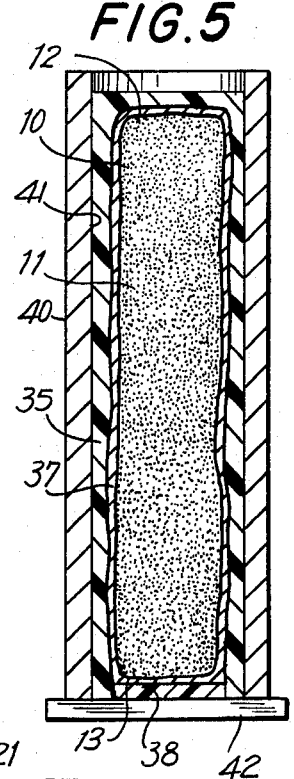
FIG. 5 is a vertical sectional view of the mold of FIG. 4 with the core sample inserted therein.

FIG. 5 is an illustration of the core sample 10 in its fully inserted position within the mold 40. The sample 10 is maintained in the mold during the ensuing curing of the plastic mixture. The mixture is cured by first holding it at room temperature for a period of time sufficient to permit the plastic to set up and by thereafter placing the mold in an oven to maintain the mixture at an elevated temperature for a period of time sufficient to complete the curing of the material. Although the curing times will depend in part upon the particular type of coating material and on the ambient conditions to which the material is subjected, particularly good results are achieved by continuing the room temperature curing for at least about four hours and by then holding the mixture at an elevated temperature of approximately 180° F. for at least about eight hours.

Figure 6:
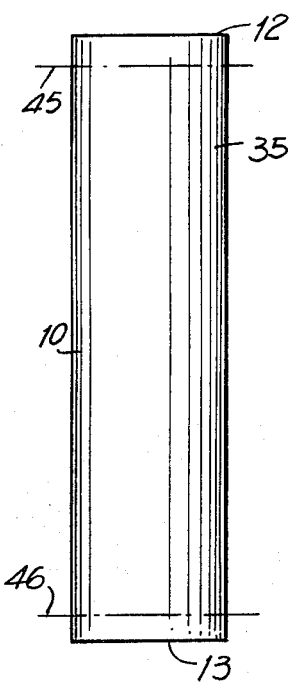
FIG. 6 is a side elevational view of the coated core sample after its removal from the mold.

When the curing of the plastic coating 35 is complete, the base member 42 is removed, and the coated core sample 10 is removed from the mold 10 by pressing the upper end 12. The ends 12 and 13 are then cut off through the use of a suitable saw, for example, as shown schematically by the broken lines 45 and 46 in FIG. 6. These cuts should be made at right angles to the axis of the sample 10 and at a sufficient distance from the sample ends to remove all traces of plastic from the exposed ends.

The completed coating 35 covers the entire peripheral surface 11 of the core sample 10. The coating accurately conforms to the sample surface but does not bond to it because of the layer 37 of petroleum jelly. The coating is thin and stiff with very few voids or other imperfections and has a thickness within the above described limits.

The coated core sample 10 is positioned within the core holder shown in FIG. 7 and is flushed with toluene, hexane or other organic solvent to remove the petroleum jelly from the pore spaces. The sample is then thoroughly dried by maintaining it in an oven at a temperature of, say, 180° F. The thus dried sample is in condition for the running of the various tests discussed heretofore.

The following examples are set forth in illustration of this invention and should not be construed as a limitation thereof.

EXAMPLE I

Uniaxial Compressibility Test

A right cylinder limestone test sample similar to that illustrated in FIG. 1 and having a diameter of 2.490 cm. was drilled from a full diameter core obtained from a well borehole. The test sample was cleaned of hydrocarbons with toluene, bleached of salt with methanol and thoroughly dried. A porosity determination was made and showed that the sample had a porosity of 1.5 percent.

The dried sample was coated with petroleum jelly and the excess was removed by hand rubbing.

A plastic mixture was prepared of 93 percent by weight C9-4183 HYSOL epoxy resin and 7 percent H9-3469 aromatic/alaphatic amine hardener.

Figure 4:
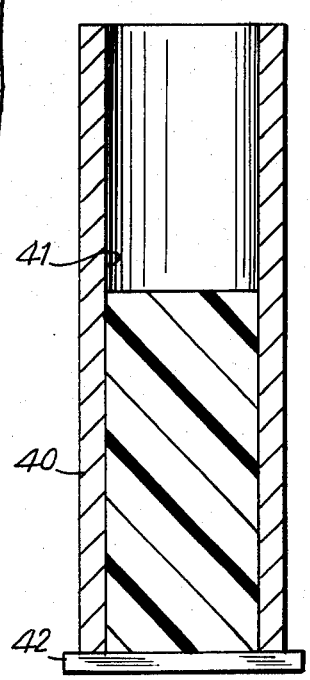
FIG. 4 is a vertical sectional view of a mold for applying a plastic coating to the entire exposed surface of the core sample.

A stainless steel right cylinder mold having a polished interior and a three-eights inch wall was attached to a base member as illustrated in FIG. 4, and a film of HYSOL AC4-4368 mold release was sprayed on the interior wall. The mold was then partially filled with enough plastic mixture to cover the sample that was subsequently submerged in it. The sample was slowly pressed in the plastic through the top of the mold, and plastic flowed between the sides of the sample and mold until the top of the sample was covered. The sample was submerged at a slow rate to enable the plastic to coat the sample without trapping air.

The plastic coated sample was maintained within the mold at a room temperature for about four hours and cured overnight in the mold at about 180° F. in an oven. The sample and mold were then removed from the oven and allowed to cool slowly to avoid cracking the thin plastic coating. The base member was then detached, and the plastic coated sample was pushed out of the mold far enough to expose one end. The exposed end was cut around the plastic with a sharp instrument until the plastic on the end came off. The end of the sample was ground with emery paper laid flat on a cabinet top until the end was flat and perpendicular to the axis of the mold and the sample grains were exposed. Most pore spaces were seen under a microscope to be free of plastic. The sample was then pressed toward the opposite end of the mold until the other end of the sample was exposed, and it was cut and ground in a similar manner. The sample was then pressed out of the mold, and toluene was passed through the sample to remove the residual petroleum jelly and to establish that the pore spaces could be vented during the actual testing. The thickness of the plastic coating on the sample was 0.025 cm.

The sample was then dried, saturated with brine and inserted into a right steel cylinder similar to that used for the mold. An axial test was run using a hydraulic press to stress the sample along its axis and a dial indicator for length change readings to 0.0001 inch. The maximum confining pressure that the sample was subjected to during testing was 10,000 pounds per square inch. Predetermined plastic permeability and instrument corrections were used in the course of calculating the sample compressibility from the measured data. The test results were acceptable to experienced analysts.

EXAMPLE II

Uniaxial Compressibility Test

A 2.459 cm. diameter limestone core sample was cut from a full diameter core obtained from a well borehole, and the procedure of Example I was followed to obtain uniaxial compressibility test data.

The wall thickness of the plastic coating on the sample was 0.041 cm. The maximum confining pressure that the sample was subjected to during testing was 10,000 pounds per square inch, and the porosity of the sample was 19.6%. The results of this test were acceptable to experienced analysts.

EXAMPLE III

Uniaxial Compressibility Test

A siltstone sample was cut from a full diameter core obtained from a well borehole for a uniaxial compressibility test. The sample was cut as close as possible to a right cylinder. The diameter of the sample was 2.520 cm.

The sample was prepared and tested as described in Example I. The test results were acceptable to experienced analysts.

The wall thickness of the plastic coating on the sample was 0.010 cm. The maximum confining pressure that the sample was subjected to during testing was 8000 pounds per square inch, and the porosity of the sample was 9.16%.

EXAMPLE IV

Hydrostatic Compressibility Test

A sandstone sample was cut from a full diameter core obtained from a well bore for hydrostatic compressibility testing. The sample was cut as close as possible to a right cylinder.

The sample was cleaned of salt and hydrocarbons and dried. Air permeability and porosity determinations were made, and the resulting measurements showed that the sample exhibited high permeability and moderate porosity.

The sample was then coated with petroleum jelly as in Example I. A plastic cup similar to the layer 38 (FIG. 3) was placed on the bottom end of this high permeability sample, and the cap was allowed to harden at room conditions. The cap was sanded on the edges where it extended beyond the diameter of the sample. The sample was then coated with plastic and cured as described in Example I, and the ends were sawed off to obtain sample ends that were free of plastic. The wall thickness of the plastic coating on the sample was 0.020 cm.

The sample was then placed in a rubber sleeve core holder, and a compressibility test was performed in a conventional manner under a confining pressure which reached a maximum of 5,400 pounds per square inch. The test results were acceptable to experienced analysts.

In each of the foregoing examples a high uniform coating was observed on the sample with very few voids or other imperfections. The coating was sufficiently flexible to obtain accurate measurements and yet was sufficiently rigid to prevent either the coating or the core holder sleeve from entering the pore spaces on the sample's cylindrical surface. The coating also exhibited good resistance to the various cleaning and other solvents used during core preparation and testing.

Although the invention has been illustrated and described with particular reference to the coating of core samples for oil and gas wells, in many respects it is also applicable to the coating of other samples which are to be tested for particular properties. Several additional uses for the invention will suggest themselves to those skilled in the art upon a perusal of the foregoing disclosure.

The terms and expressions which have been employed are used as terms of description and not of limitation, and there is no intention, in the use of such terms and expressions, of excluding any equivalents of the features shown and described, or portions thereof, it being recognized that various modifications are possible within the spirit and scope of the invention.

What is claimed is:

1. A method of preparing a geological core sample containing pore spaces and representative of an underground formation from which the sample is taken to prepare the core sample for testing in testing apparatus in which pressures are applied to the core sample to simulate approximate overburden pressure to which the sample material was subjected in its underground formation, the method comprising;

applying a petroleum based release material to the exterior surface of the core sample;

partially filling a mold with a plastic mixture of hardenable epoxy resin and hardener therefor;

inserting one end of said core sample into the partially filled mold, the space between said sample and the interior of said mold lying within the range of from about 0.010 cm. to about 0.050 cm, to form a plastic coating on said sample substantially free of voids and having a thickness within said range so that the plastic coating on the thus coated sample is sufficiently thick and stiff to prevent intrusion into the pores of the core sample during testing of the core sample under confining pressure yet is sufficiently thin to transmit the confining pressure to the sample;

applying a sufficient pressure to the opposite end of the core sample to slowly urge said sample into said mold until the plastic mixture therein covers the entire surface of said sample;

curing the plastic material for a period of time sufficient to form a stiff coating on the core sample;

removing the thus-coated core sample from said mold; and cutting off the ends of the core sample to remove the coating from said ends.

2. The method of claim 1 which further comprises, curing the coating on the core sample by maintaining the same at room temperature for at least about four hours and thereafter maintaining said coating at an elevated temperature for at least about eight hours.

3. The method of claim 1, wherein the pressure applied to the sample is not less than about 5 pounds per square inch.

4. The method of claim 1 further comprising:

grinding the ends of said coated core sample until such ends are flat and perpendicular to the axis of said core sample and the grains of core sample are exposed.

5. The method of claim 1 comprising flushing the core sample with an organic cleaning material prior to applying said release material.

6. The method of claim 5 wherein said cleaning material is selected from a group consisting of toluene and hexane.

7. The method of claim 1, wherein the coating is cured by maintaining the same at room temperature for at least about four hours and thereafter maintaining said coating at an elevated temperature for at least about eight hours.

* * * * *